US007194930B2

(12) United States Patent
Dawson

(10) Patent No.: US 7,194,930 B2
(45) Date of Patent: Mar. 27, 2007

(54) HANDLE

(75) Inventor: Guy Simon Dawson, Hamilton (NZ)

(73) Assignee: Assa Abloy Financial Services AB, Stockholm (SE)

( * ) Notice: Subject to any disclaimer, the term of this patent is extended or adjusted under 35 U.S.C. 154(b) by 28 days.

(21) Appl. No.: 10/646,611

(22) Filed: Aug. 22, 2003

(65) Prior Publication Data

US 2004/0074051 A1 Apr. 22, 2004

(30) Foreign Application Priority Data

Aug. 23, 2002 (NZ) .................................... 520956

(51) Int. Cl.
*G05G 1/00* (2006.01)
*A45C 3/00* (2006.01)
*A01K 89/00* (2006.01)

(52) U.S. Cl. .......................... 74/547; 74/545; 242/284; 242/283; 16/429

(58) Field of Classification Search ................ 242/284, 242/285; 74/547, 545, 527, 528; 251/99, 251/98; 16/429; 49/341-345, 336, 337
See application file for complete search history.

(56) References Cited

U.S. PATENT DOCUMENTS 3,007,348 A * 11/1961 Barnes ........................ 74/547
3,843,177 A * 10/1974 Waldo ........................ 292/254
4,858,845 A * 8/1989 Kaneko ...................... 242/285
5,368,249 A * 11/1994 Takeuchi .................... 242/284
5,400,473 A * 3/1995 Delman ....................... 16/429
5,443,570 A * 8/1995 Hirano ....................... 242/284
5,560,082 A * 10/1996 Vetter .......................... 16/429
5,765,771 A * 6/1998 Yamaguchi et al. ........ 242/284
6,450,063 B1 * 9/2002 Harvey et al. ................ 74/547
6,598,265 B2 * 7/2003 Lee ............................. 16/429

* cited by examiner

*Primary Examiner*—Vinh T. Luong
(74) *Attorney, Agent, or Firm*—Blakely Sokoloff Taylor & Zafman

(57) ABSTRACT

A handle for a window operator. The handle includes a handle member 10 pivotally coupled to a base 11. A locking mechanism releasably locks the handle member 10 in a position relative to the base 11 which corresponds to an in-use position of the handle member. The locking mechanism includes a locking member 14 within the handle member 10. The locking member 14 performs a blocking action to prevent pivotal movement of the handle member relative to the base. The locking member has a push button 15 accessible to an exterior surface of the handle member whereby the locking member can be moved to remove the blocking action and allow the handle to be pivoted to a non-use position.

14 Claims, 6 Drawing Sheets

HANDLE

BACKGROUND OF THE INVENTION

This invention relates to a handle.

The present invention more particularly relates to a pivoting handle of a type where the handle can fold between operative and stored (non-use) positions. A handle of this type would commonly be used as part of the winding mechanism of a closure operator.

It is, for example, known to provide a closure operator for the opening and closing of a closure such as a window sash hingedly mounted in a window frame. The operator includes a handle which can be rotated so as to operate a winding mechanism whereby an elongate chain or the like can apply the opening or closing action to the hinged sash. An example of such a window operator can be found in our U.S. Pat. Nos. 5,829,199 and 5,937,582.

It is also known to construct an operator handle of this type so that it is able to be folded between use and nonuse positions. For example, an operator handle of this type can be found in our New Zealand patent specification No. 335475.

It is known with such foldable handles to provide a detent which endeavours to hold the handle at least in its in-use position. This is to try and prevent the handle "collapsing" during operation. However, a detent mechanism is not always able to withstand the forces which may arise during operation. Thus even the presence of a detent does not prevent the handle from collapsing during operation.

Nowadays the aesthetic appeal of hardware is important. Therefore, in addition to the hardware having utility it must also not adversely impact on the look of say the window with which the item of hardware is associated. Consequently, any means for locking a handle in, at least, its in-use position must be unobtrusive with any locking mechanism largely confined within the interior of the handle. There must, however, also be a balance between the mechanism having aesthetic appeal yet at the same time being ergonomic.

SUMMARY OF THE INVENTION

It is an object of the present invention to provide a handle with a locking mechanism whereby the handle can, at least, be locked in its operative position but yet be releasable to fold to a non-use position.

It is a further object of the present invention to provide a lockable pivoting handle where the locking mechanism which can enable the handle to be at least locked in its operative position does not adversely impact on the aesthetics of the handle with the majority of the locking mechanism being confined within the handle.

Broadly according to the present invention there is provided a handle which includes a handle member pivotally coupled to a base and a locking mechanism which releasably locks the handle member in a position relative to the base which corresponds to an in-use position of the handle member, the locking mechanism including a locking member within the handle member, said locking member being movable between a first position where it performs a blocking action between the handle member and the base to prevent pivotal movement of the handle member relative to the base and a second position where said blocking action is removed, the locking member being coupled to a push button accessible at an exterior surface of the handle member.

Preferably the push button includes a head which is slidingly located in a recess in the handle member. In the preferred form the peripheral shape of the recess substantially corresponds to the peripheral shape of the button.

In the preferred construction the locking member is biased into said first position by a biasing means. The biasing means is preferably a leaf spring. The leaf spring can be fixed to the locking member and have a distal end which acts on a portion of the handle member.

According to the preferred form there is also provided stop means to prevent movement of the locking member under action of the biasing means from moving beyond the first position.

BRIEF DESCRIPTION OF THE DRAWINGS

In the following more detailed description of a preferred embodiment of the present invention reference will be made to the accompanying drawings in which:—

DETAILED DESCRIPTION OF A PREFERRED EMBODIMENT OF THE INVENTION

Figure 1:
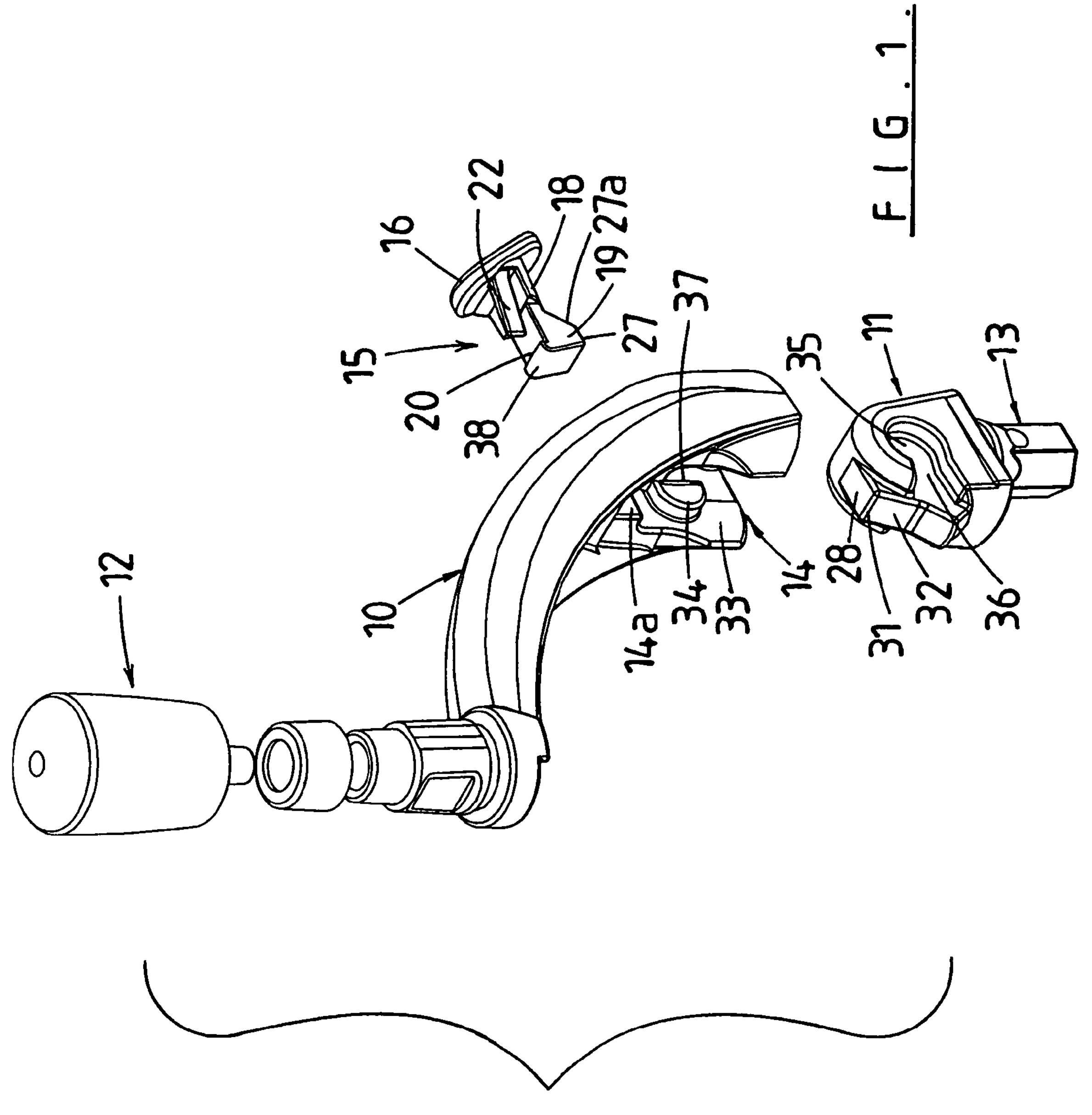
FIG. 1 is an exploded illustration of the component parts of a handle incorporating the present invention.

As shown in the drawings, the handle includes an elongate handle member 10 which is pivotally coupled to a pivot base 11. The distal end of the handle 10 is provided with a knob 12. The pivot base 11 includes a connecting portion 13 whereby the pivot base 11 can be connected to a mechanism to be rotated such as the winding mechanism of say a window operator.

The manner in which the pivot base 11 is coupled by mounting portion 13 to a winding mechanism and the actual construction and connection of the knob 12 to the handle 10 does not form part of the present invention.

As illustrated by FIG. 1 the handle 10 incorporates a shaped cavity 14 which incorporates a pair of opposed surfaces 33. Projecting from the surfaces 33 is a pair of opposed spigots 34.

The pivot base 11 has, at opposite sides thereof, a recess 35. An opening 36 leads into each recess, the opening 36 being of a width which is less than the diameter of the recess 35. As can be seen in FIG. 1 each spigot 34 has a flattened side 37 so that when the handle member 10 is positioned relative to the pivot base 11 which corresponds to the "stored position" the spigots 34 can be pushed through the openings 36 such that the spigots become located in the recesses 35. The spigots 34 can thus rotate in the recesses 35 thereby establishing the pivot axis about which the handle member 10 can be folded between the in-use (operating) and non-use (stored) positions.

Figure 4:
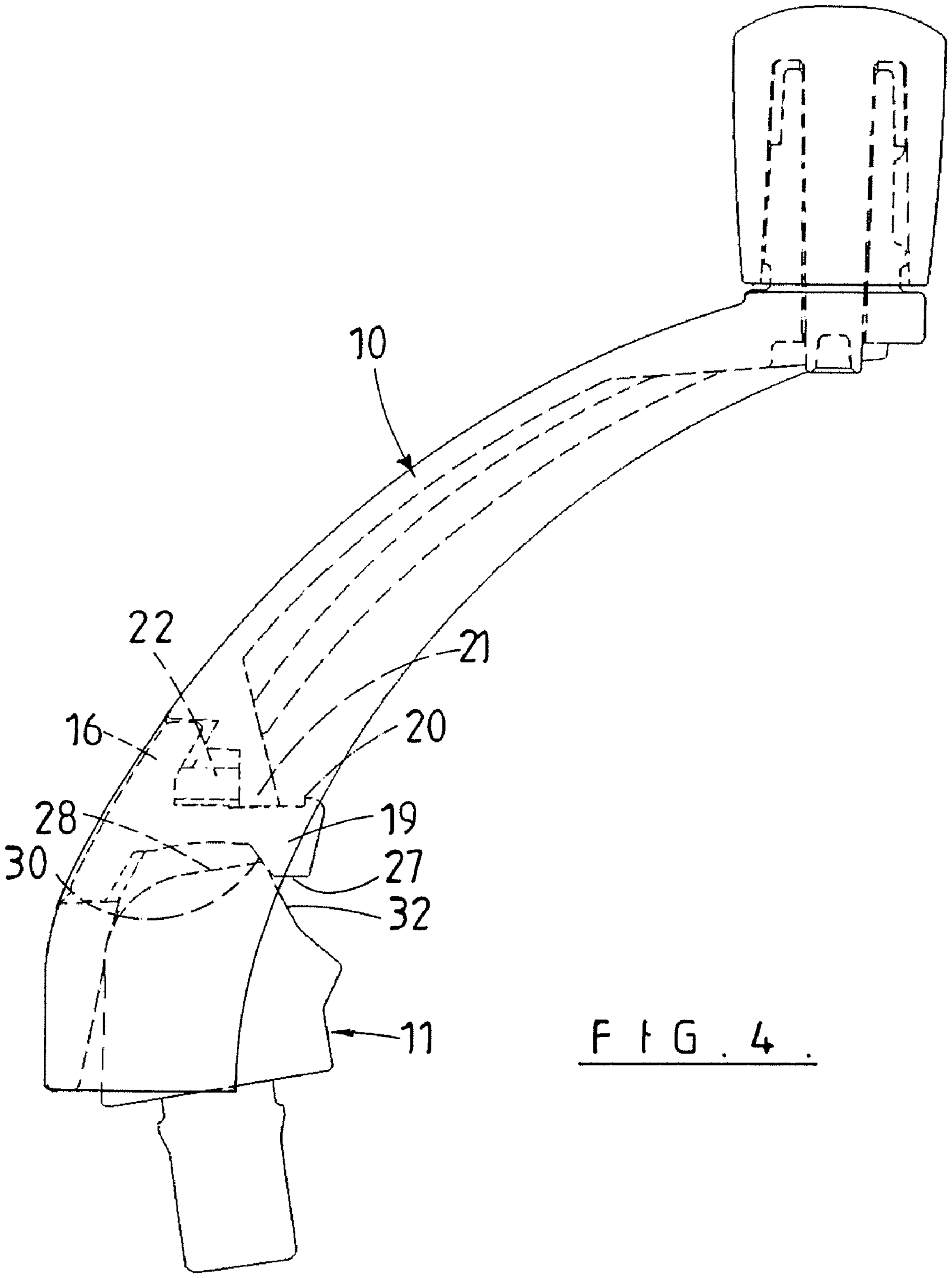
FIGS. 4 and 5 are views similar to FIG. 3 but showing the handle being progressively moved toward the stored position.
Figure 5:
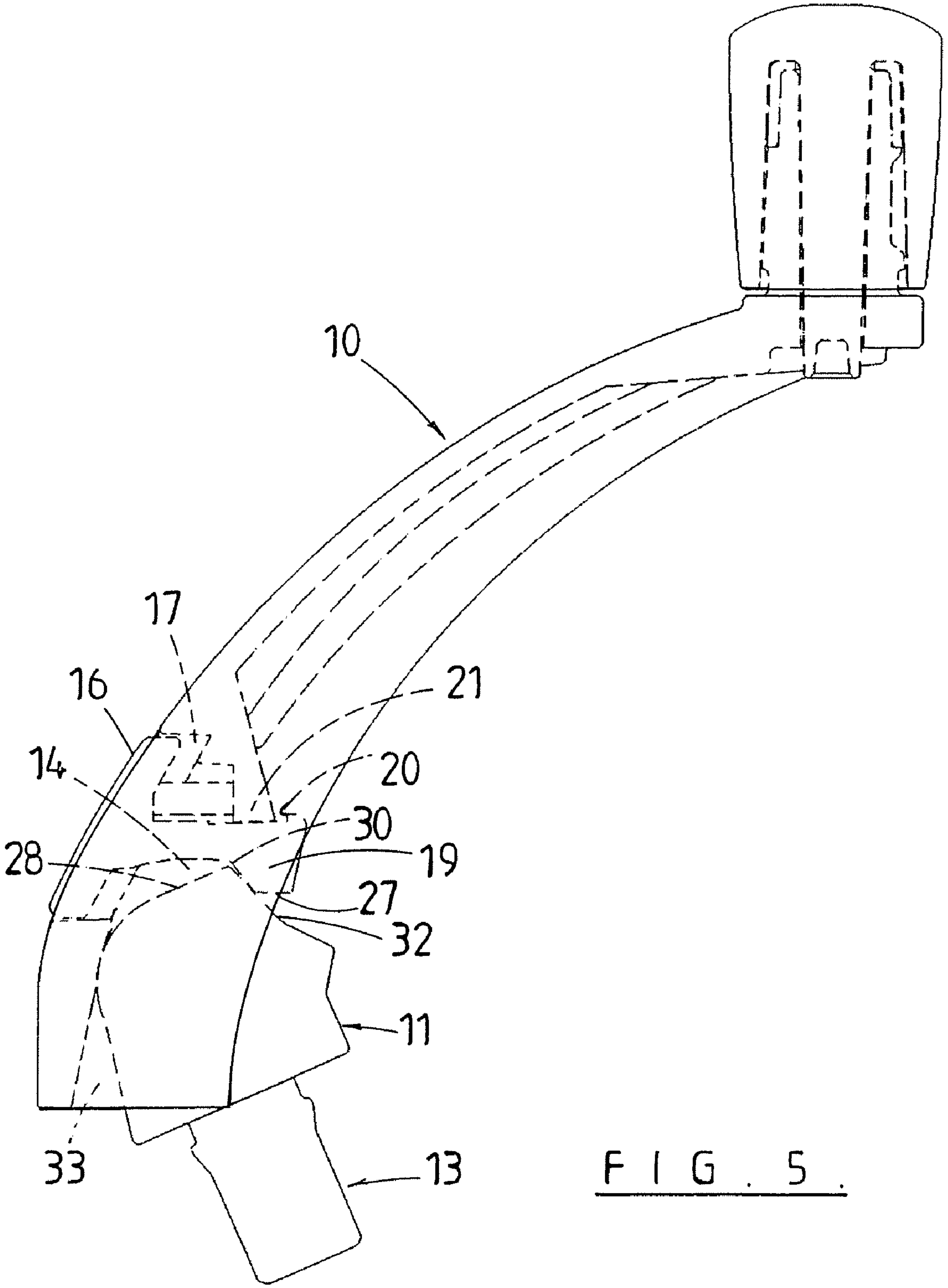
Figure 6:
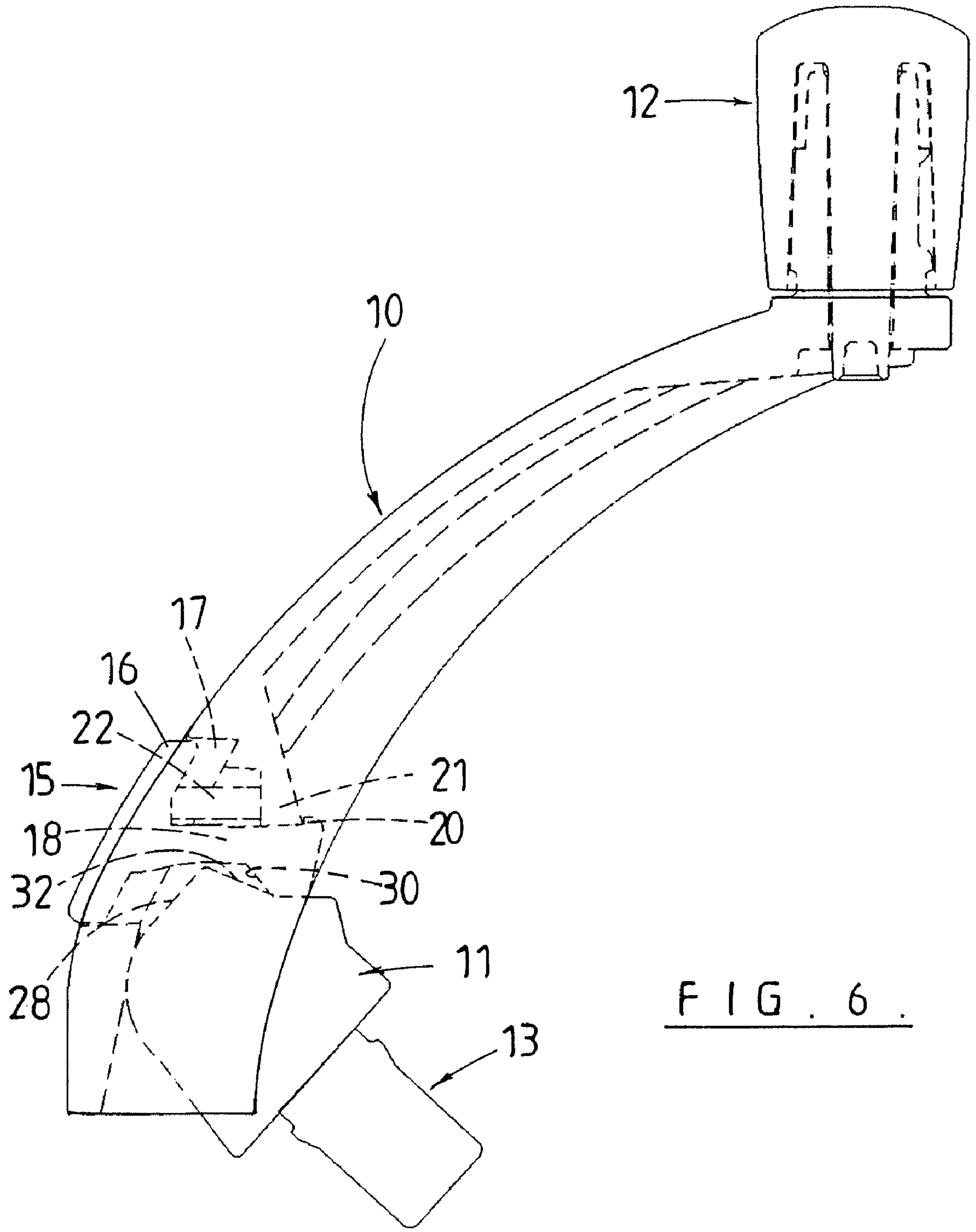
FIG. 6 is yet a further similar view but showing the handle in the stored position.

As can be seen from FIGS. 2 to 6 the handle 10 can be pivoted relative to the pivot base 11 so as to be folded from the operating position to the stored position. FIG. 6 shows the handle 10 folded into the stored position.

According to the present invention the handle is positively locked in the operating position by a locking mechanism. This, however, is according to a preferred form of the invention but, in another form, the handle 10 can be positively locked in both the operating and stored positions. In yet a further form the handle could be held by a detent action in the stored position. The following description will, however, describe a handle 10 that can be positively locked in the operating position and simply rest in the stored position.

Associated with the shaped cavity 14 is a moveable button 15. The button 15 has a head portion 16 which is slidingly engageable within a shaped recess 17 in the outer surface of the handle member 10. In the preferred form the peripheral shape of the shaped recess 17 is commensurate with the peripheral shape of head 16. Recess 17 opens into recess 14.

Extending from the head 16 is a locking member which is formed by a stem 18 which has at its distal end an enlarged section 19. This enlarged section 19 includes a lip 20 which in the operating position of the handle engages against a projection 21 which is formed as part of the handle 10. The wall 21 in part defines a recess 17*a* which opens into recess 17.

The head 16, stem 18 and elongated section 19 are preferably moulded in one unit from a plastics material. In a preferred form the plastics material is fibre reinforced.

The engagement of lip 20 with projection 21 arises because the button 15 is biased to such position by a spring element 22. In one form of the invention the spring element 22 is formed by a separate leaf spring element, one end of which is anchored between walls 33 of cavity 14. A cranked free end of the spring can thus engage against a shaped or profiled area of the stem portion 18 to apply a biasing affect on the button 15/stem 18.

The spring element could be a coil spring which engages between head 16 and the end wall surface 21*a* (of wall 21) of recess 17*a*.

However, in the preferred form of the invention the spring 22 is a leaf spring mounted to or formed as an integral part of button 15. As can be seen clearly in FIG. 1 the leaf spring 22 extends along the stem 18 from button 15 to terminate a distance from the lip 20. Thus as shown in FIG. 2 the distal end of spring element 22 engages against wall surface 21*a*.

Figure 2:
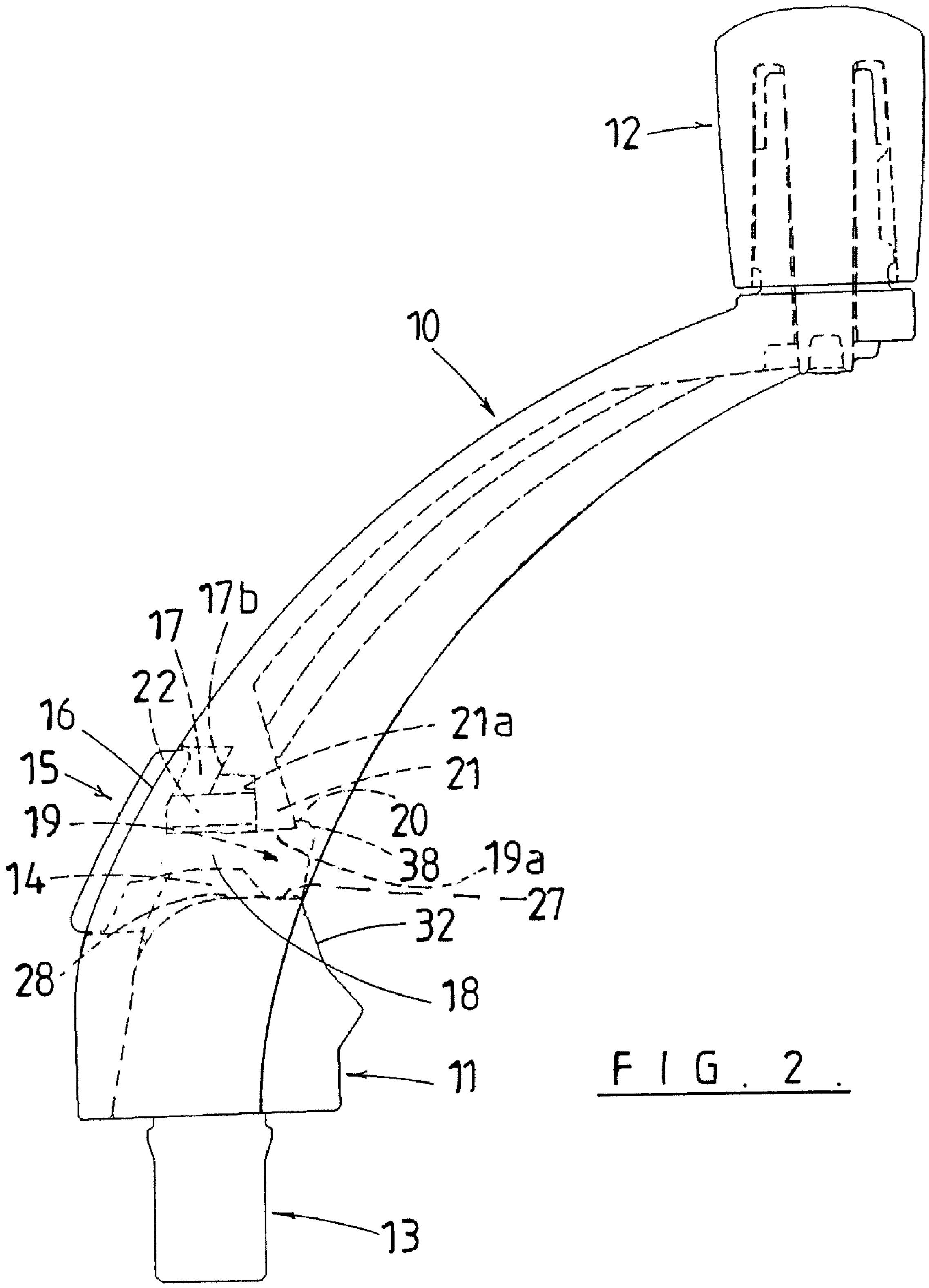
FIG. 2 is a cut-away elevation view of the handle of FIG. 1, with internal structure shown in dashed lines the handle being shown in the operating position.
Figure 3:
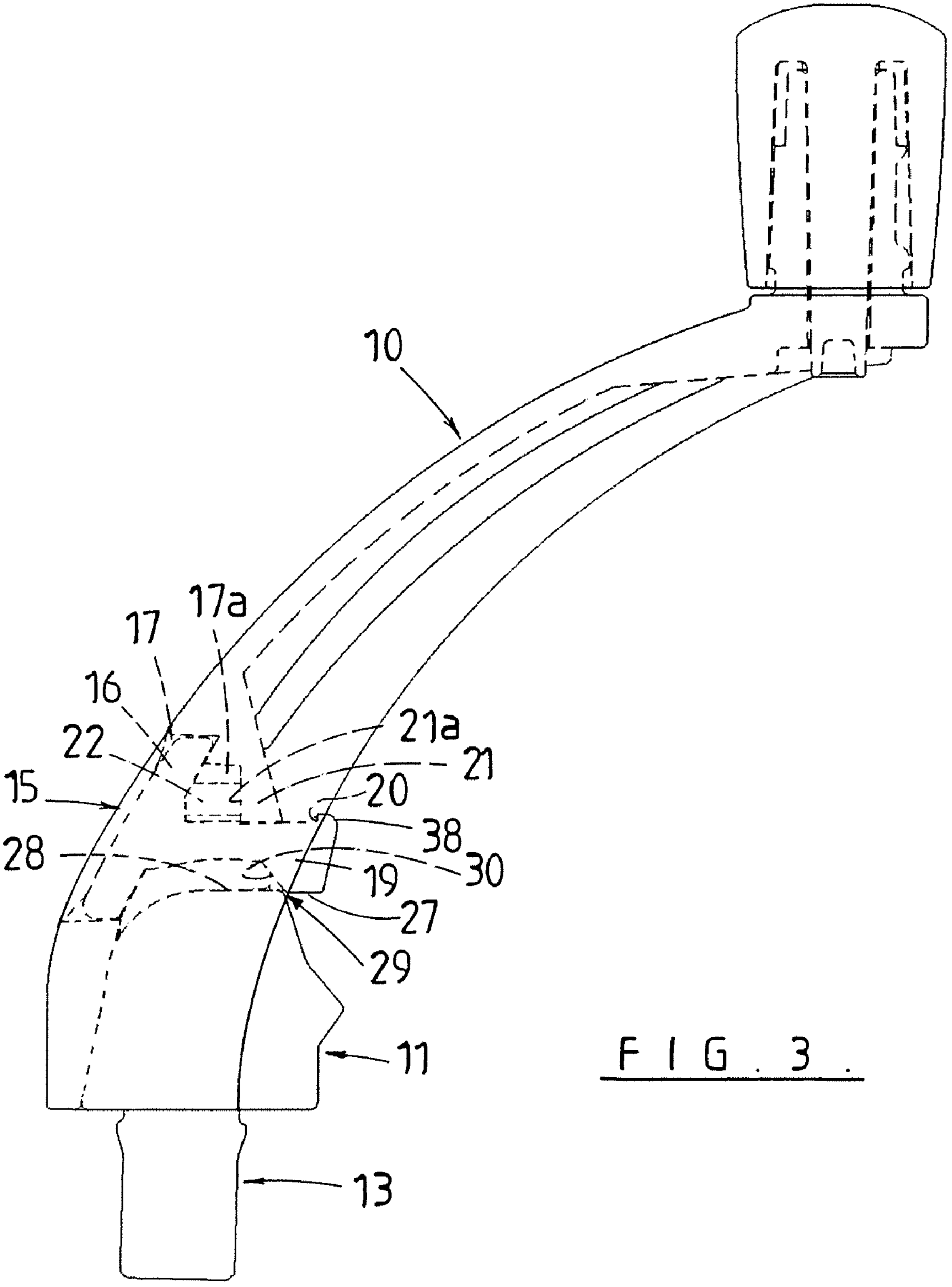
FIG. 3 is a view similar to FIG. 2 but with a release button depressed to enable the handle to be folded into a stored position.

Accordingly, the spring element 22 sets up a biasing effect when the button 16 is pushed inwardly from the position shown in FIG. 2 to the position shown in FIG. 3. The biasing action of the spring element 22 is such that the stem portion 18 is biased to move in a direction which causes the head 16 of button 15 to project from or be located primarily within the shaped recess 17 as can be seen, for example, in FIG. 2. The extent by which the head 16 projects from the recess 17 is determined by the stop action of the lip 20 engaging with wall 21.

Referring now to FIG. 1, it will be seen that the enlarged or blocking portion 19 incorporates a contact surface 27 which engages with a top surface 28 (FIG. 2) of the pivot base 11. Because of this interface of surfaces 27 and 28 and the contact between the part 19*a* of the enlarged portion 19 and the end wall 21 a mechanical blocking action against any pivoting of the handle 10 relative to the pivot base 11 is established.

If it is desired to move the handle member 10 from the operating (first position) to the stored (second position) positions a pressure e.g. via the thumb or the finger of a user of the handle is applied to head 16 of button 15. This causes the head 16 to move into the shaped recess 17 against the pressure of spring 22. This results in a corresponding movement of the stem portion 18 until the head 16 is prevented from further movement by virtue of contact between the underside of head 16 and wall 17*b* of the recess 17 (see FIG. 3).

At this point a clearance 29 is established between the edge 31 (see FIG. 1) of top surface 28 and the adjacent inclined surface 30 of enlarged portion 19. This clearance 29 enables the handle 10 to be pivoted relative to pivot base 11 so that it ultimately assumes the stored position shown in FIG. 6. As shown in FIGS. 4 to 6 release of pressure on the button 15 enables the button, under the action of the bias created by spring element 22 to move back toward its "rest" position until in the stored position of handle 10 the lip 20, once again, engages with wall 21 (FIG. 6).

To return the handle 10 to the operating position, the handle is simply lifted up (un-folded) into the operating position. During movement back to the operating position the inclined surface 30 of the enlarged portion 19 engages with the inclined surface 32 of the pivot base 11. This causes the button 15 to once again move against the biasing force of spring 22 but only until such time as the inclined surface 30 passes over edge 31 and surface 27 of the locking member locates above surface 28 of the pivot base 11 whereupon the button 15 is free to move under the action of the spring 22. This causes the button 15 to revert to its projecting "rest" position whereupon the handle member 10 is automatically locked into its operating position.

Because of the action of spring element 22 the button reverts reasonably quickly to its rest position. In doing so the lip 20 moves into contact with projection 21 in such a way that an audible "click" is created. This provides an aural indicator to the user that the handle has reached its operating and locked position.

A further feature of the invention is the method of assembly of the component parts. As described above the pivot base 11 is combined by aligning the smallest cross-sectional profile of the spigots 34 with the restricted openings 36 into recesses 35. Once this has occurred the enlarged end 19 of the stem 18 is introduced into the recess 17 and forced through the aperture which is defined by sidewalls 14*a* of the recess 14, the top surface 28 of pivot base 11 and the lowermost edge surface of projection 21. This end of the leading edge 38 of lip 20 is slightly curved or chamfered to enable the enlarged end 19 to be forced through the aforementioned aperture. Once the lip 20 has past through the aperture the locking member 18 is prevented from being readily withdrawn. Furthermore, the presence of enlarged portion 19 adjacent surface 28 of pivot base 11 prevents the pivot base from being slid off the spigots 34.

The handle can thus be readily assembled by sliding the handle onto the pivot base 11 followed by insertion of the locking member 18. The three components interact in such a manner that neither the locking member 18 nor the pivot base 11 can be readily disassembled from the handle member 10. No separate fasteners are therefore required in the assembly of the component parts.

Throughout the movement of base 11 relative to the handle 10 surface 32 of the base 11 is in contact with edge 27*a* of the enlarged portion 19. This can be achieved by profiling surface 32 in such a way as to ensure that the contact is continual.

This contact provides a number of benefits. It stops the button 15 from rattling. It also holds the button 15 against becoming displaced i.e. lip 20 will always act as an end stop. The contact also tends to bias the handle 10 towards its stored position once the blocking action has been removed.

The present invention thus provides a foldable handle which is positively locked in its operating position. When the handle is being used to rotate say a winding mechanism it will not collapse under such use.

Nevertheless, by a simple pushing action on the button 15 the handle 10 can be released so that it can be moved into a stored position. The handle when moved back into the operating position is automatically and audibly locked into such position.

The invention thus provides a very simple yet effective means of locking a foldable handle in its operating position. The mechanism is also easy to use so that the handle can readily be moved into a stored position. By virtue of the head of the button closely engaging within a shaped recess in the handle, the presence of the button does not have any adverse effect on the aesthetic appearance of the handle. The aesthetic appeal of the handle is not adversely affected by the presence of the locking mechanism as this is confined within the handle and thus largely out of view.

What is claimed is:

1. A handle comprising:

a handle member, a base engaged within the handle member and pivotably coupled to the handle member such that the handle member is able to pivot relative to the base between a first position corresponding to an in-use position of the handle member and a second position corresponding to a non-use position, a locking mechanism which prevents the handle from moving to the second position upon a force to cause the handle to move to the second position being applied to the handle member, the locking mechanism including a locking member slidingly engaged through the handle member and able to move between a locking position and a release position, the locking member being coupled to a push button located at an exterior surface of the handle member, the locking mechanism having a blocking portion located within the handle and positioned between and in contact with opposed surfaces of the handle member and the base to thereby block any pivoting of the handle member from the first position, wherein the locking member is biased into said locking position by a biasing mechanism, the biasing mechanism including a leaf spring, whereby a pushing action applied to the push button causes the locking mechanism to move to the release position to remove the blocking action of the blocking portion.

2. The handle as claimed in claim 1, wherein the push button includes a head which is slidingly located in a recess in the handle member.

3. The handle as claimed in claim 2, wherein a peripheral shape of the recess substantially corresponds to a peripheral shape of the button.

4. The handle as claimed in claim 1, wherein the leaf spring is fixed to the locking member and has a distal end which engages with a part of the handle member.

5. The handle as claimed in claim 1, further including a stop to prevent movement of the locking member under action of the biasing mechanism from moving beyond the locking position.

6. The handle as claimed in claim 5, wherein the stop is a lip projecting from the locking member and engaged with an engagement surface of the handle member when the handle member is in the first position.

7. The handle as claimed in claim 1, wherein the locking member further includes a profiled portion which provides a clearance between the locking portion and the pivot base when the blocking member is in the release position.

8. The handle as claimed in claim 7, wherein the profiled portion includes a contact surface which contacts a profiled surface of the pivot base during movement of the handle member between the first and second positions.

9. The handle as claimed in claim 8, wherein the push button includes a head which is slidingly located in a recess in the handle member, the peripheral shape of the recess substantially corresponding to the peripheral shape of the button.

10. The handle as claimed in claim 9, wherein the recess includes a contact surface which is contacted by the head when the locking member is in the release position.

11. The handle as claimed in claim 9, wherein the spring is located between the locking member and the handle member.

12. The handle as claimed in claim 9, further including a stop to prevent movement of the locking member under action of the biasing mechanism from moving beyond the locking position.

13. The handle as claimed in claim 12, wherein the stop is a lip projecting from the locking member and engaged with an engagement surface of the handle member when the handle member is in the first position.

14. The handle as claimed in claim 13, wherein the lip projects from the blocking portion and the engagement surface is formed by a wall in the handle member, said wall further forming a second engagement surface, the blocking portion of the locking member being located between second engagement surface and a surface of the pivot base to create the blocking action.

* * * * *